(12) United States Patent
Eaker

(10) Patent No.: US 12,238,201 B1
(45) Date of Patent: Feb. 25, 2025

(54) CIPHER

(71) Applicant: Gary Eaker, Jacksonville, FL (US)

(72) Inventor: Gary Eaker, Jacksonville, FL (US)

(\*) Notice: Subject to any disclaimer, the term of this patent is extended or adjusted under 35 U.S.C. 154(b) by 41 days.

(21) Appl. No.: 17/865,862

(22) Filed: Jul. 15, 2022

Related U.S. Application Data

(60) Provisional application No. 63/360,550, filed on Oct. 14, 2021.

(51) Int. Cl.
*H04L 9/06* (2006.01)
*G06F 21/60* (2013.01)

(52) U.S. Cl.
CPC .......... *H04L 9/0618* (2013.01); *G06F 21/602* (2013.01)

(58) Field of Classification Search
CPC ............................. H04L 9/0618; G06F 21/602
See application file for complete search history.

(56) References Cited

U.S. PATENT DOCUMENTS

| | | | |
|---|---|---|---|
| 6,445,797 B1* | 9/2002 | McGough | H04L 9/0631 380/278 |
| 11,750,375 B2* | 9/2023 | Si | H04L 9/0618 713/171 |
| 2017/0329943 A1* | 11/2017 | Choi | H04L 63/0428 |
| 2019/0288850 A1* | 9/2019 | Beecham | G06F 21/6209 |

\* cited by examiner

*Primary Examiner* — Sm A Rahman
(74) *Attorney, Agent, or Firm* — Andrew C. Aitken

(57) ABSTRACT

A method for encryption and decryption of files or email messages text, is disclosed that involves loading a p-text file for encryption into a computing device, determining if total bit number of said file is divisible by six and adding any necessary bits to result in bit number divisible by six, combining the bit sequence with a matching number of pad bits using an XOR additive cipher resulting in a modified file, converting said modified file to C-text, six bits a time, using a conversion table, rearranging the c text sequence using Prime Set Permutation. inserting a PSP lock character into the sequence, inserting pad pointer sequence characters into said sequence and displaying the file name saved.

7 Claims, 15 Drawing Sheets

STEP 1 - PREPARATION

- We'll encrypt "demo" message
- Message saved in TXT file named demo.txt
- File size is 4 bytes or 32 bits
- The Userkey will be the character "A" (6bits)

STEP 2 - FILE TO BINARY

- demo displayed as 32 bits - 01100100011001010110110101101111
- 4 bits added, <u>0110</u>, to ensure perfect divisibility by 6
- 36 bit sequence now to process

STEP 4 - LOGICAL OPERATION

Content in binary form: 011001 100100 011001 010110 110101 101111 — 705

Pad bits used for encryption: 010010 010111 001100 110111 101001 010010 — 707

After XOR our binary content will be: 001011 110011 010101 100001 011100 111101 — 709

STEP 5 - BINARY TO C-TEXT CHARACTERS

001011 → 3
110011 → L
010101 → H
100001 → 8
011100 → q
111101 — 805 → B — 809

See Appendix 2 for Lookup Table

Step 1 - Preparation

- Let's assume that we have an 8 character c-text char sequence to be reagganged / permuted.
- Assume that their correct starting order is as listed below with the six bit values randomly assigned by the random program number, 64 possible, below each character.

| B | G | H | F | A | C | D | E |
|---|---|---|---|---|---|---|---|
| 111001 | 001011 | 10000 | 010101 | 011110 | 110101 | 110000 | 001001 |

Step 2 - Prime Number

- Since there are 8 char's we begin by adding 3 Ghost char's to make it 11, the next prime.
- Ghost char's "!" are added below.

| B | G | H | F | A | C | D | E | ! | ! | ! |
|---|---|---|---|---|---|---|---|---|---|---|
| 0 | 1 | 2 | 3 | 4 | 5 | 6 | 7 | 8 | 9 | 10 |

Step 3 - Start & Jump Points

START POINT
- Start of 23 random bits, from pad. 01011101101111101000110
- Decimal value is 3,071,814
- Wrapping around decimal value we will get effective Start Point -9
- By 3,071,814/11 shows 9 as wrap around by
- 279,255x11=3,071,805+9= 3,071,814

JUMP POINT
- Start of 23 random bits, from pad. 10101100101011001101000
- Decimal value is 5,658,216
- Wrapping around decimal value we will get effective Start Point -3
- By 5,658,216/11 shows 3 as wrap around by
- 514,383x11=5,658,213+3= 5,658,216

FIG. 9B

PAD 1 BITS GENERATED, AND USED, USING "A" (6 BITS) AS USER KEY USED FOR DEMO 1&2. PAD BITS USED FOR ENCRYPTION FOLLOW CONTROL BITS. TOP 3 SEQUENCES BELOW ARE DEMO 1 PAD BITS USED, AND THE BOTTOM 3 SEQUENCES ARE PAD BITS USED FOR DEMO 2.

ENCRYPTION CONFIG VALUES USED

| Function | Bit count | Bit Sequences from pad bits |
|---|---|---|
| PPS | 42 | 100111100110010100101110101100001011001101 |
| Program number | 6 | 111011 = 59 |
| Additional XOR bits (6), with first 4 bits used for insertion for perfect divisibility by 6. | 6 | 011001 |
| PSP Start point | 26 | 01100001001111011111001001 = 25819081 |
| PSP Jump point | 26 | 00001101111010101111000000 = 3648448 |
| Special char insert position | 26 | 11100111001110111101001015 = 60616613 |
| Special char bit sequence | 6 | 111101 |

FIG. 14

PPS BINARY to C-TEXT CHAR LOOKUP TABLE

Appendix 3

| | | | | | | | |
|---|---|---|---|---|---|---|---|
| 000000=>0 | 000001=>0 | 000010=>2 | 000011=>3 | 000100=>4 | 000101=>5 | 000110=>6 | 000111=>7 |
| 001000=>8 | 001001=>9 | 001010=>A | 001011=>B | 001100=>C | 001101=>D | 001110=>E | 001111=>F |
| 010000=>G | 010001=>H | 010010=>I | 010011=>J | 010100=>K | 010101=>L | 010110=>M | 010111=>N |
| 011000=>O | 011001=>P | 011010=>Q | 011011=>R | 011100=>S | 011101=>T | 011110=>U | 011111=>V |
| 100000=>W | 100001=>X | 100010=>Y | 100011=>Z | 100100=>a | 100101=>b | 100110=>c | 100111=>d |
| 101000=>e | 101001=>f | 101010=>g | 101011=>h | 101100=>i | 101101=>j | 101110=>k | 101111=>l |
| 110000=>m | 110001=>n | 110010=>o | 110011=>0 | 110100=>q | 110101=>r | 110110=>s | 110111=>t |
| 111000=>u | 111001=>v | 111010=>w | 111011=>x | 111100=>y | 111101=>z | 111110=>t | 111111=>/ |

FIG. 15

CIPHER

CROSS REFERENCE TO RELATED APPLICATIONS

The Applicant claims the benefit of the filing date of U.S. Application No. 63/360,550 filed on Oct. 14, 2021.

FIELD OF THE INVENTION

The present invention generally relates to a Complex Pad Cipher called the SPAE cipher, for Secure Pad Advanced Encryption, and secure methods of file storage and communication for devices and Internet transmission.

BACKGROUND OF THE INVENTION

Prior art methods of communication that required security generally use software programs that encrypt communication data between two users using encryption algorithms. For example, the modern Blowfish algorithm U.S. Pat. No. 6,014,444 relies upon a symmetric key approach for encryption. These cipher methods use a key, known by both the sender and receiver, which is used by the encryption algorithm to encrypt the data into an unrecognizable format and what appears to be a random sequence of characters. The data is then passed from the sender to the receiver, and after transmission, the receiver uses the same user key to run a decryption algorithm to decrypt the message.

The One Time Pad cipher or "OTP" was developed in 1918 by Major Joseph Mauborgne, US Army, and is the closest cipher to the complex pad cipher, in principle, to the invention. The OTP is the only unbreakable cipher since it relies on a random sequence of bits to combine with a file converted to p-text or plain text bit sequence. It is, and will likely remain, the only provably unbreakable cipher. True random pad is used only once to logically combine with plain-text ("p-text"), resulting in an unbreakable cipher-text ("c-text"), but at a cost of Pad Generation (PadGen), distribution, and synchronization difficulties which are three formidable problems.

The proposed cipher varies from the OTP by using pseudorandom bit sequences it generates instead of acquiring random ones. It also has additional complexity while solving the greatest problems of the OTP: PadGen, Distribution, and Synchronization. The result is a cipher that is computationally secure while being far more practical than the OTP.

SUMMARY OF THE INVENTION

The primary embodiment of the present invention is a complex pad cipher that includes the steps of (1) converting any file type to a binary sequence, (2) inserting bits into the binary sequence so that it is perfectly divisible by six, (3) logically combining, using XOR, the p-text bits with an equal number of pad bits, (4) converting the encrypted bit sequence to c-text or cipher text characters, (5) applying Prime Set Permutation ("PSP"), to the c-text character sequence, (6) inserting PSP lock character into the sequence, (7) inserting Pad Pointer Sequence ("PPS") characters, a 42 bit sequence in pads that point to other control bits and pad bits that are used in pads that are inserted into the sequence and (8) displaying the file name saved. A decryption sequence for the cipher is also disclosed.

BRIEF DESCRIPTION OF THE DRAWINGS

FIG. 9B illustrates steps of the PSP process.

FIG. 13 depicts binary sequences with a 6-bit user key UK chosen to encrypt the 4 character Notepad file "demo" twice, as an encryption example.

FIG. 14 is a chart depicting sample encryption configuration values.

FIG. 15 is a look-up table for PPS bit sequence to c-text characters for the previous version.

DETAILED DESCRIPTION

Figure 1:
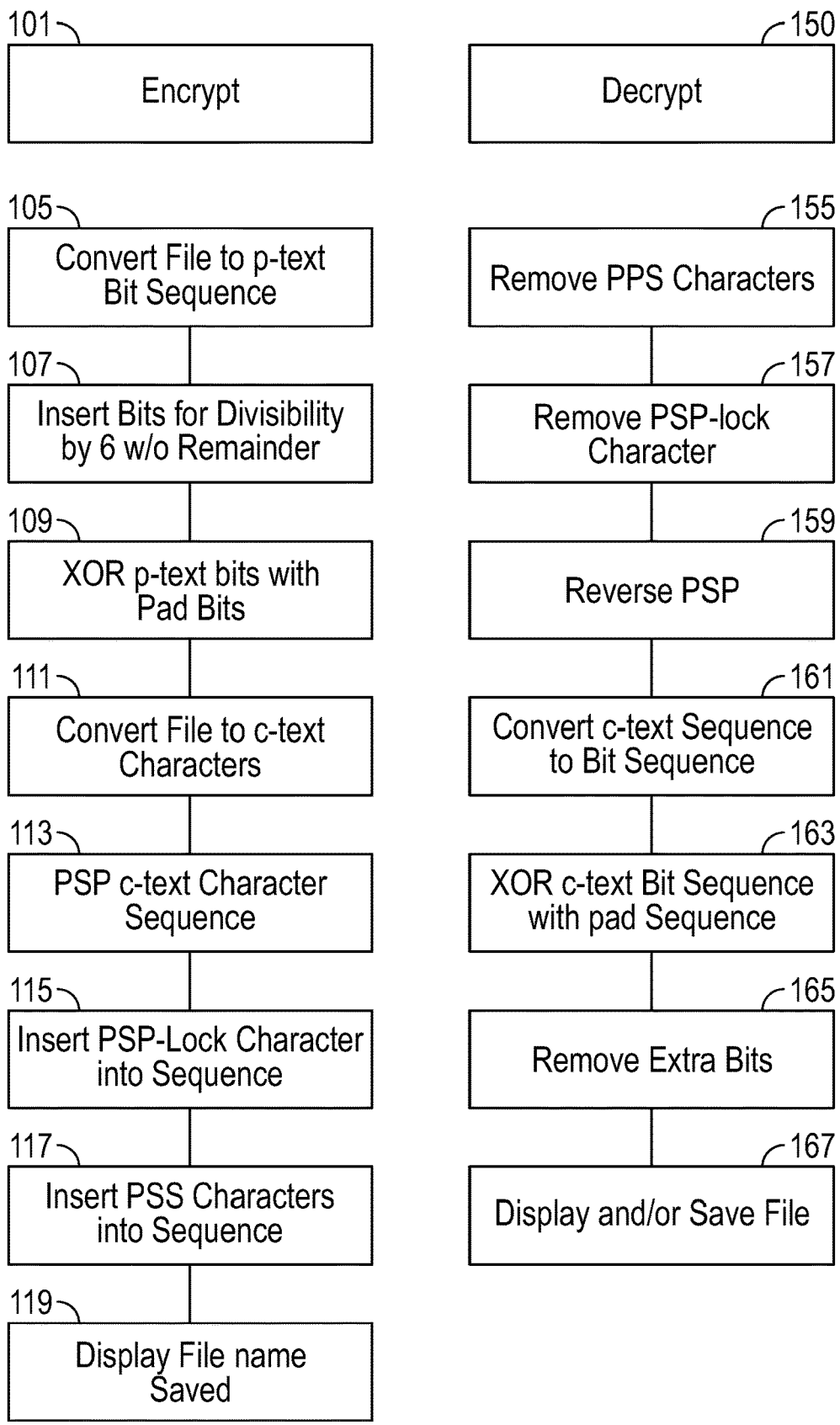
FIG. 1 is flowchart illustrating encryption and decryption steps according to a method of the invention.

The present invention is directed to a new cipher class of a variable key, synchronous, non-periodic, stream cipher, employing automatic generation and distribution of pads, with automatic synchronization of pad usage for all members in a communication circle, having a maximum of 32 members. The technique allows users to choose a user key (UK) as short as six bits and up to $2^{27}$, or up to 134,217,728, bits, with no difference in encryption speed for key size. Many communication circles with different members and UKs are possible.

In the cipher disclosed, strength is preferred over encryption speed, so it is not as fast as some of the 256-bit ciphers now widely used, but it is far stronger. Encryption speeds that have been timed on an Envy laptop are running at a rate of around 5M file/second, with a maximum size of files for encryption set at 500M, which may be enlarged later. With the cipher complexity the likelihood of a significant break is beyond improbable. Even if numerous Summit supercomputers were dedicated to the task for an extended period, the computer power and time required for a successful brute force or other type of attack is too great to attempt, if a large UK is chosen.

SPAE Cipher Operation

SPAE (Secure Pad Advanced Encryption) is built upon the principles of the One Time Pad (OTP), the only provably unbreakable cipher. Unlike the OTP, it uses indeterminable pseudo-random bit sequences that it generates, rather than true random sequences, to logically combine with plain-text (p-text) bits to disguise them.

The SPAE cipher also adds numerous other complexities to ensure unprecedented computational security. SPAE solves three significant problems associated with OTP methods: PadGen, Distribution, and Synchronization with all those in a communication circle. Pads generated of $2^{23}$ bits each are made and stored, before being used to encrypt or decrypt files. Files being encrypted always employ unused pad bits for encryption and control for every file. Bits used are marked so that they are used only once for encryption. Unused bits are always used for encryption. The PPS are marked, control bits, and pad bits for every file encrypted so that once a file is encrypted all those pad bits used, for every pad that was used for encryption, are marked. Pad bits and control bits used are marked. Pads are used sequentially and by member number in a circle. The first member in the circle or circle manager is identified as member one. In an example with two members, after member two the circle would be closed so no new members could be added. The pads for member one encryption would be 1,3,5 . . . nth and for member 2 would be 2,4,6 . . . nth When encrypting a file, the number of bits that are needed is known for all the control bits and the pad bits. A file of the total number of bits used for every file encrypted is stored for each member. In a two person circle, the odd numbered pads are used to encrypt the first member and the even numbered pads are used to encrypt for member 2. The file for pad bits used is continuously updated. When a file is encrypted the total bits used to encrypt would be known and the next PPS sequence to be used and in what pad number for the member would also be known. The constant updating of this information would serve to essentially "mark" all prior pad bits as "used."

In an embodiment, the software collects and maintains a file regarding the encryption for each circle. The file includes information including the total bits count, the requested bits count, the used bits count and the available bits count. The software calculates which pads will be using bits in a step where it obtains a list of requested Pad ID. If it is the first attempt for encryption, the software obtains the member's count in the Circle. In subsequent steps it is necessary to know which Pads belong to this member.

Referring now to FIG. 1, the encryption process 101 begins with the conversion of a file into binary form at step 105. At step 107, 0-5 random bits, from pad bits, are added to the front of a p-text sequence to make it perfectly divisible by six. Next, at step 109 an equal number of indeterminable pad bits are then logically combined, using XOR, with the p-text bit sequence. In cryptography, the simple XOR cipher is a type of additive cipher, an encryption algorithm that operates according to the principles:

$A \oplus 0 = A$,
$A \oplus A = 0$,
$A \oplus B = B \oplus A$,
$(A \oplus B) \oplus C = A \oplus (B \oplus C)$,
$(B \oplus A) \oplus A = B \oplus 0 = B$.

For example, where $\oplus$ denotes the exclusive disjunction (XOR) operation. See Lewin, Michael (June 2012). "All About XOR". Overload. 2 ((109): 14-19. https://accu.org/journals/overload/20/109/lewin_1915/This operation is sometimes called modulus 2 addition (or subtraction, which is identical). See Churchhouse, Robert (2002), Codes and Ciphers: Julius Caesar, the Enigma and the Internet, Cambridge: Cambridge University Press, ISBN 978-0-521-00890-7. With this logic, a string of text can be encrypted by applying the bitwise XOR operator to every character using a given key. To decrypt the output, merely reapplying the XOR function with the key will remove the cipher.

Next, at step 111 the cipher-text (c-text) bit sequence is then converted into c-text characters, six bits at a time, with 64 unique conversion tables, with one determined randomly by pad bits. The table chosen at random, from 64 possible, has each of the 64 bit sequences XOR'd with six pad bits to increase randomization further by modifying each before they are used for binary to c-text character conversion. As such, a file being encrypted by the same numbered program to convert 111000 into a character, for example, will only have a 64:1 chance of it being the same character because of the additional 6-bit randomization. Step 117 involves the insertion of the 7 PPS characters into the c-text sequence, wherein each character assigned is determined by a separate unique bit to character conversion table and each PPS character is positioned by a 26 bit sequence, converted to decimal, determined during UserKey Setup.

Figure 9A:
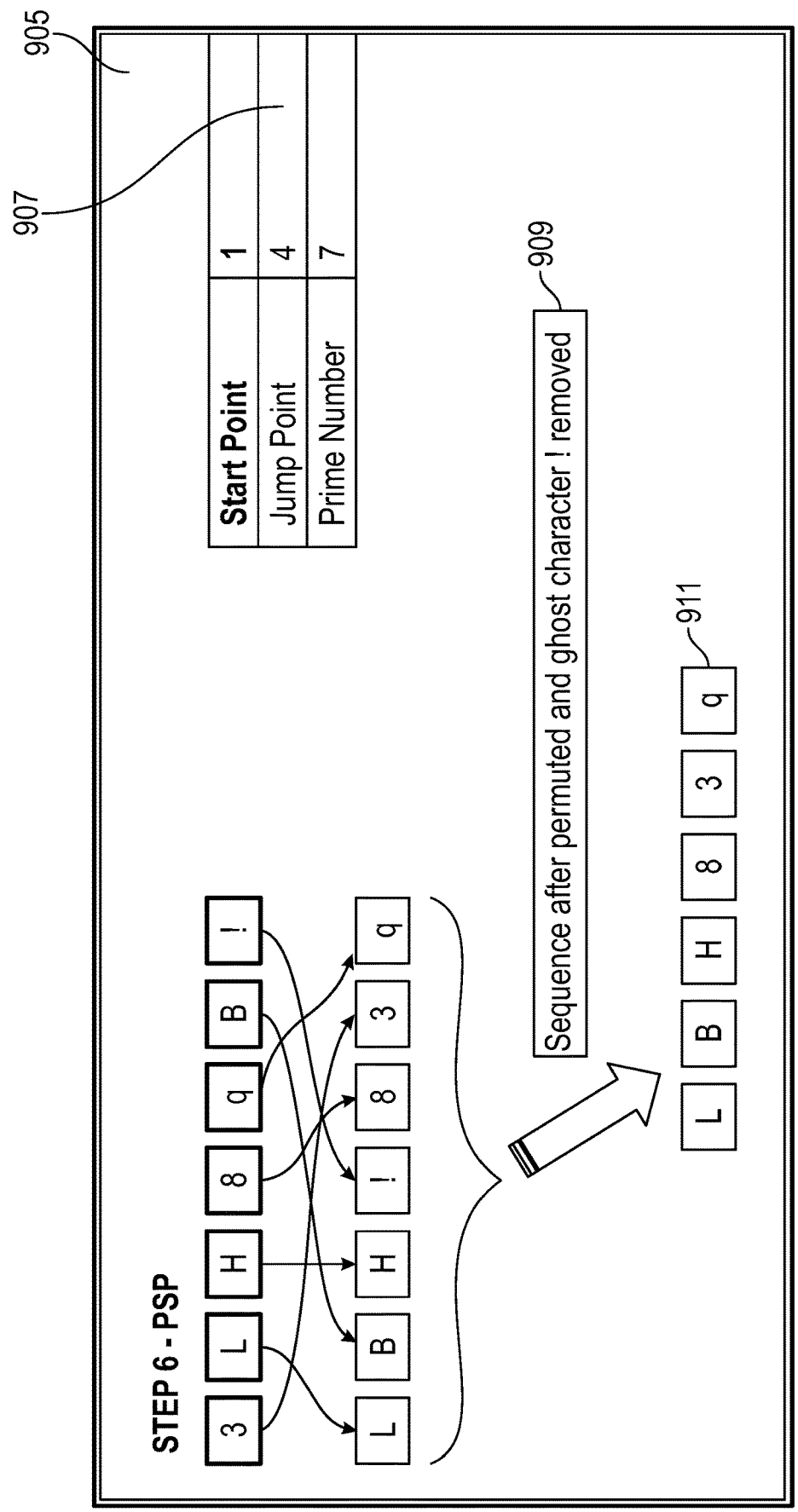
FIG. 9A illustrates a PSP step wherein ghost characters are removed, after PSP completion.
Figure 9C:
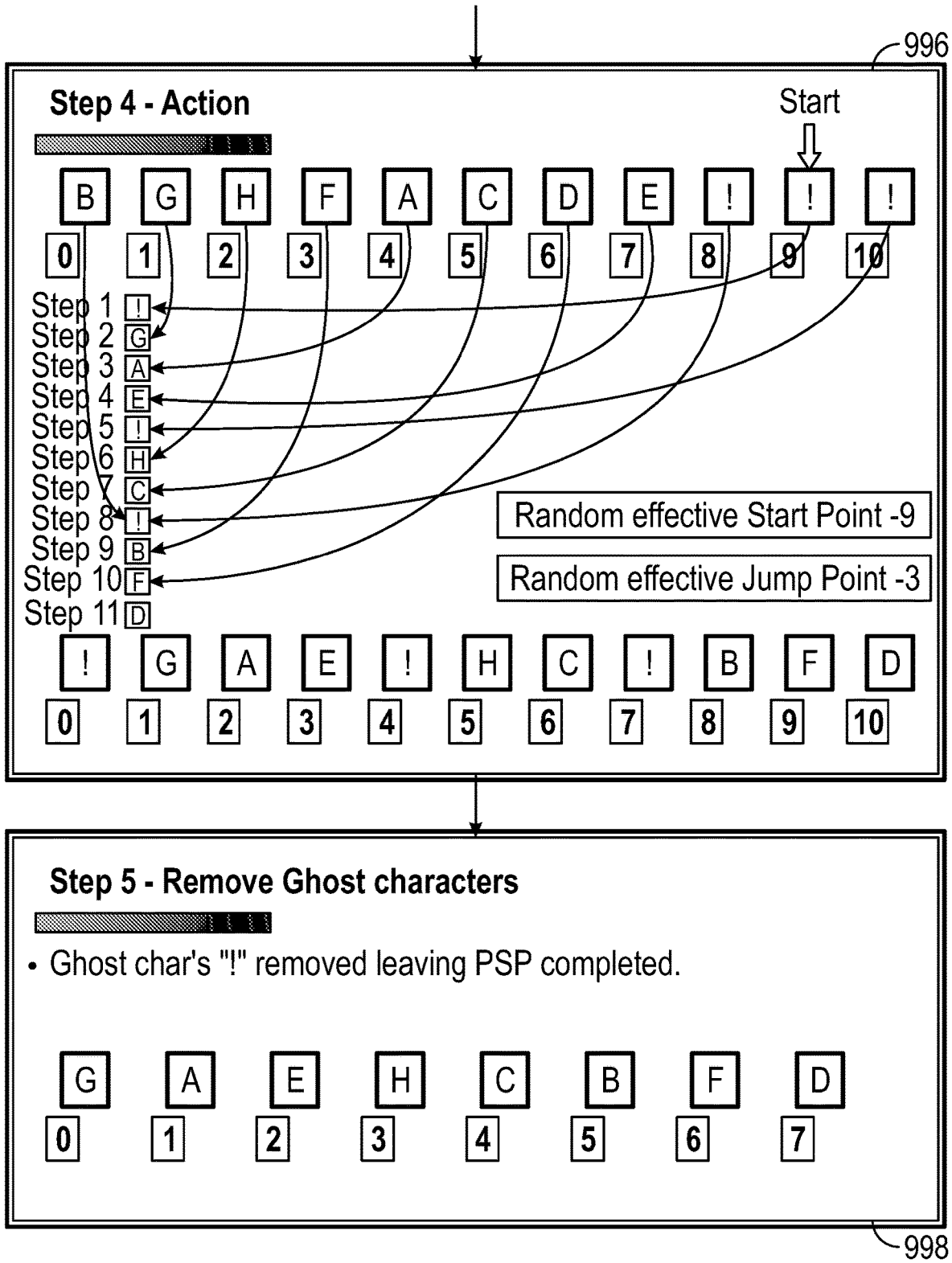
FIG. 9C illustrated further step of the PSP process.

Once every six bits is converted to its assigned/modified character the entire c-text character sequence is then completely rearranged, or permuted, using PSP at step 115 and as further illustrated in in FIGS. 9A-9C and explained herein.

Figure 10:
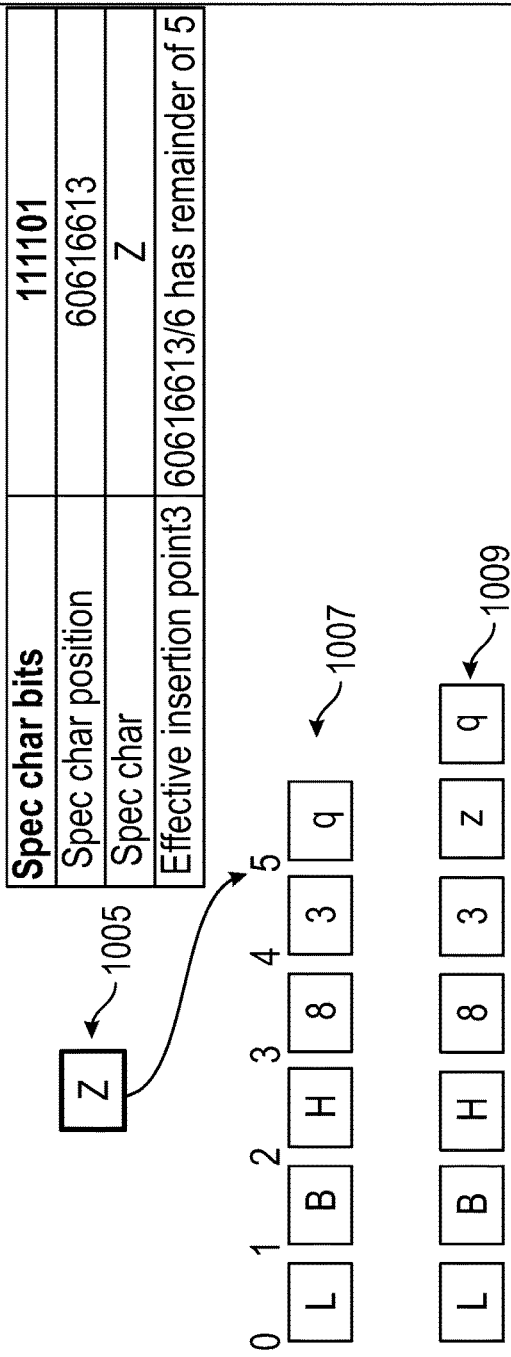
FIG. 10 illustrates the step of inserting a PSP lock character into the c-text character sequence.

Referring now to FIG. 10, when the PSP step is completed, a random c-text character, or PSP lock character, determined by 6 pad bits, is inserted into the permuted c-text sequence, into a numbered position randomly determined from 26 pad bits, using wrap around, so that it is in a different numbered position for every file encrypted, using wrap-around, with 226 positions possible. This added character acts as a lock on the PSP operation, since reversal of PSP requires that only the original c-text characters in the set originally permuted be present before PSP can be reversed.

Figure 11:
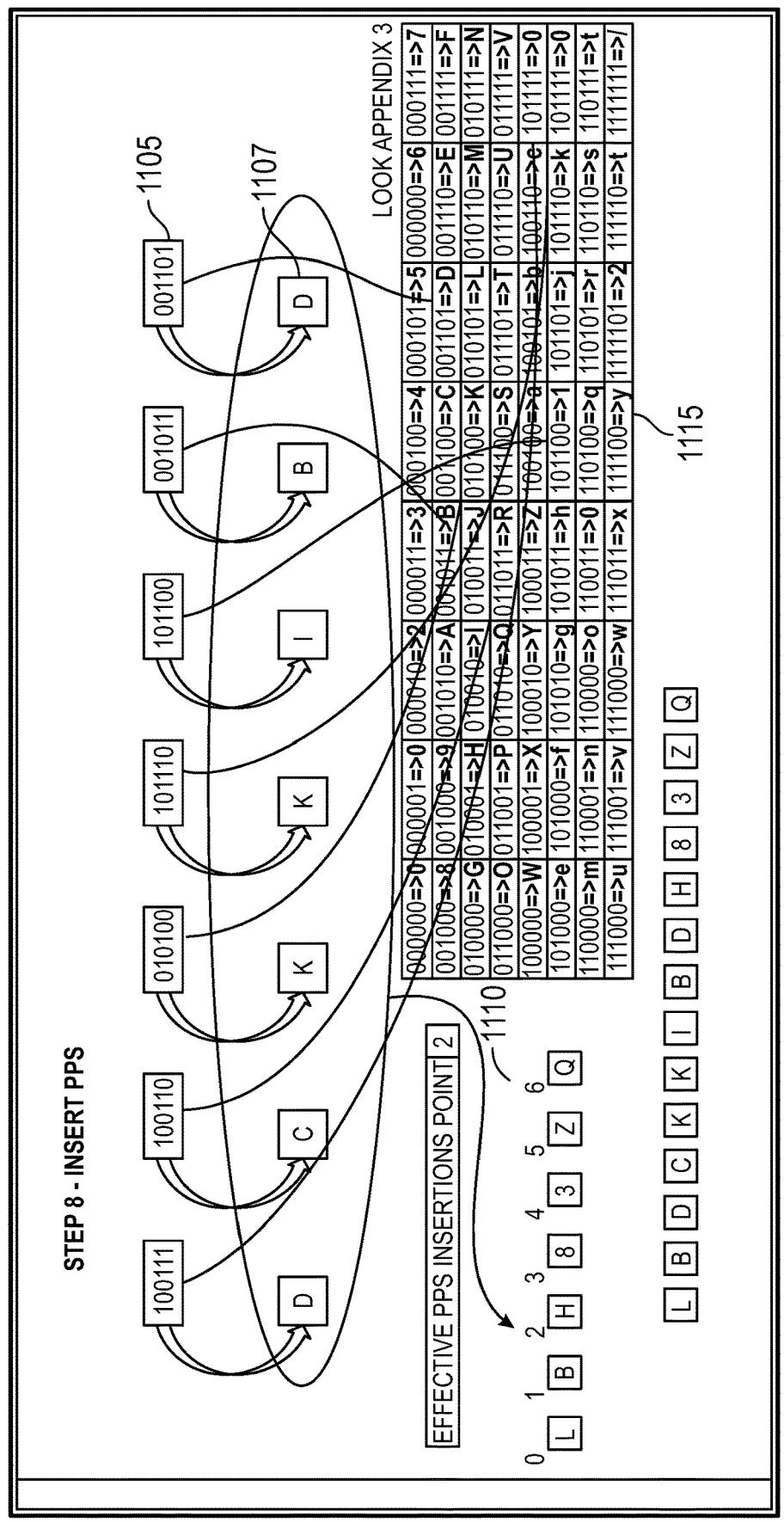
FIG. 11 illustrates the insertion of the seven PPS characters into the c-text sequence as the final step of the encryption process. Each character having a different random position number and a different bit to c-text character conversion table.

Finally, as depicted in Step 8 in FIG. 11, the seven characters 1107 representing the 42 bits of the PPS 1105 are inserted into their numbered positions of sequence 1110, using wrap-around, at 226 possible locations in the c-text sequence, using wrap-around for each. The resulting sequence is depicted at line 1115 These constantly varying random characters, determined by pad bits, must also be removed along with the additional character before PSP reversal can be accomplished. So, eight constantly varying c-text characters need removal in every file encrypted before PSP can be successfully reversed.

Figure 12:
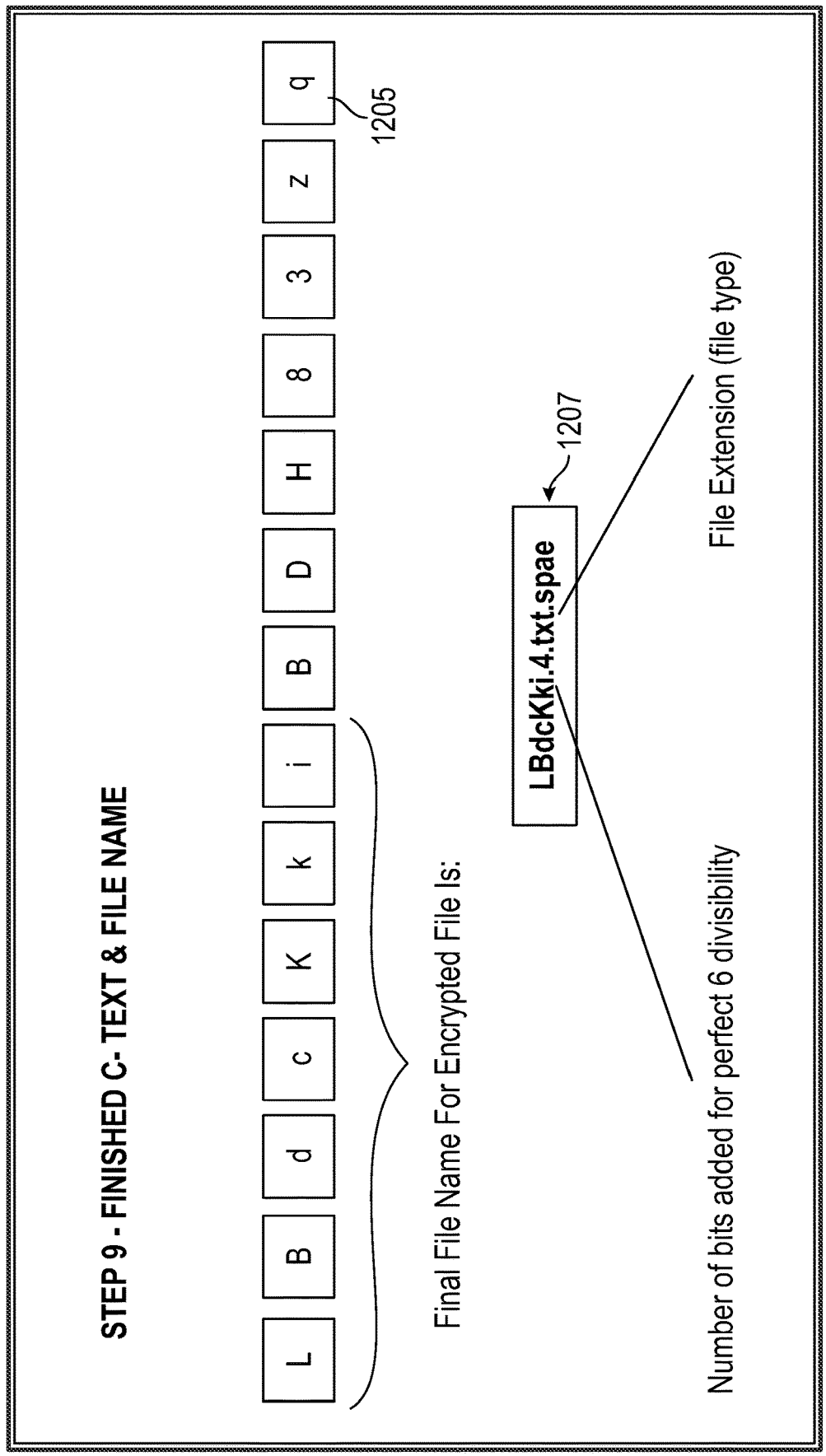
FIG. 12 depicts a finished c-text & file name after the encryption process.

Even if the eight characters, the PSP-lock character plus the seven PPS characters, were correctly guessed and removed there would be no way to determine what the remaining c-text character to bit conversion values should be for the sequence with 64 factorial possible assignments. Also, if the c-text bits could be determined, there is no way to determine the pad bits that were combined with unknown p-text sequence bits of which they are comprised. The six steps other than XOR of p-text with pad bits help to ensure unsurpassed computational security. Referring now to FIG. 12, the finished c-text and file name is determined at 1205 and saved at step 1207.

Figures 4, 5:
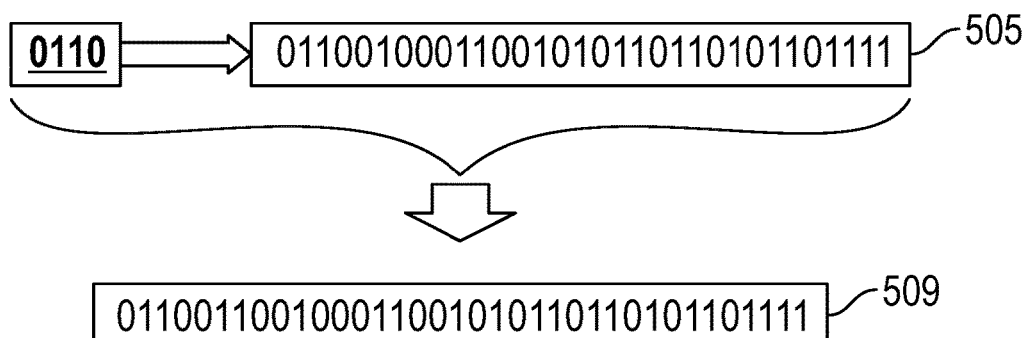
FIG. 4 illustrates the preparation for a method of encryption according to the invention.
FIG. 5 depicts the conversion of a file to binary form and adding bits to create a sequence perfectly divisible by six.

Accordingly, the encryption process begins with the file to be encrypted converted to a binary sequence. Then the total bit number is checked for divisibility by 6. If it is not perfectly divisible 0-5 bits are added to the front of the p-text sequence. The bits added are selected from pad bits. For example, referring now to FIG. 4, a demonstration message is encrypted by first saving the message in a text file. Here, the file is 4 bytes or 32 bits. The user key selected is UM seq A which is $2^{23}$ bits long. Referring back now to FIG. 5 the demo message is then converted to binary form and 4 bits 0110, from pad bits, are added at step 5 resulting in sequence

Figure 6:
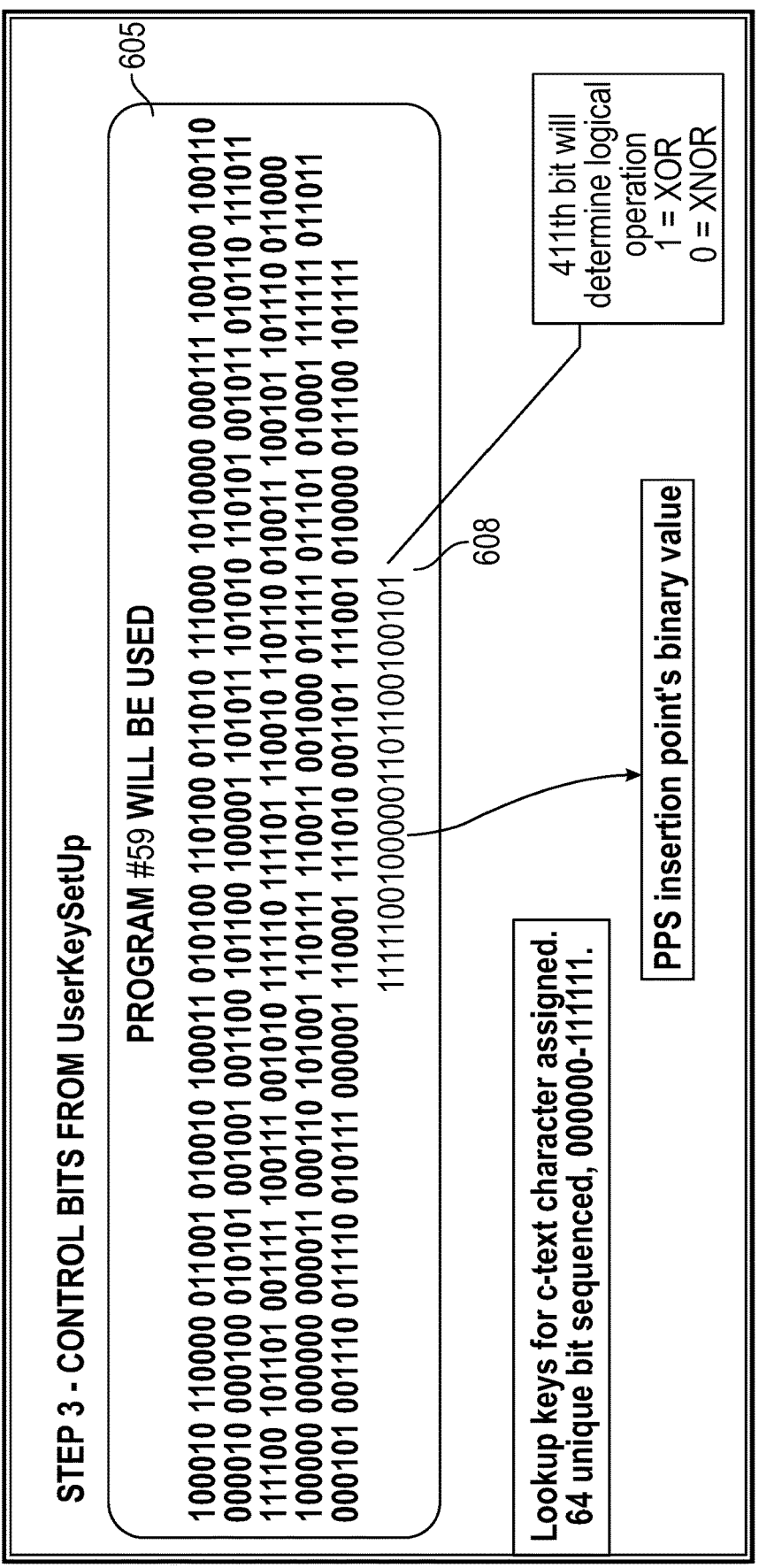
FIG. 6 is a further step in the encryption process wherein control bits are determined and used from the user key Setup steps.

509. The next step is to combine the resulting p-text bit sequence, now perfectly divisible by 6, with a matching number of pad bits using XOR. Referring now to FIG. 6, the control bits from the User Key Setup are used. At the end of the sequence a PPS insertion point 608 is provided.

Figures 7, 8:
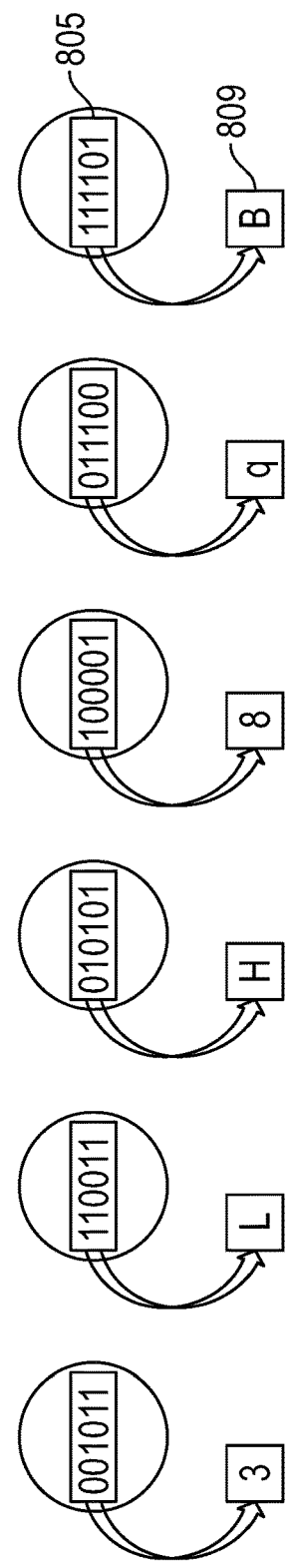
FIG. 7 illustrates the encryption step using pad bits XOR'd with p-text bits.
FIG. 8 illustrates a further step wherein the encrypted binary sequence is converted to c-text characters according to a look-up table

FIG. 7 depicts the logical operation of the conversion. The encrypted c-text bit sequence is converted, left to right, six bits at a time, to c-text characters determined by the correct conversion table made by UK Setup with those table bits, by program number, further modified by six pad bits. The content in binary form 705 is combined with pad bits 707 to result in an interim encrypted sequence 709. This bit to character variability based on a variable program number and six-bit modifier, both variable by pad bits, makes frequency analysis of a c-text sequence much more difficult since it varies with every new file that is encrypted. During UK Setup some of the initial settings found there determine how the 16 seq's in 2 columns are modified prior to their being combined and thus condensed down into a single pad sequence in the PadGen process.

The UK chosen is modified by the eight true random 2-23 bit seq's within the SPAE cipher software, and they in turn, make eight more seq's so that the total is 16. Unless there are 9 or more seq's submitted as UK. In that case 7 seq's are made to add to the 8. If 10 are submitted then only 6 are made and so on so if 16 UK seq's of 2^23 are submitted the random seq's within the SPAE cipher are not used at all to help randomize UKs submitted. A variant of the cipher might use more than one conversion table for c-text characters and modifier with separate modifiers for each table used to increase variability in c-text sequences.

A further cipher variant could decrease cipher complexity by having less than 64 programs, perhaps even just one, or a variant could increase complexity by using more than 64 programs for encryption. After the resulting encrypted bit sequence is converted to a c-text character sequence it is permuted using PSP.

All ciphers have a strength limit determined by maximum key size and the proposed cipher's variable key size of up to $2^{27}$ bits is unprecedented. But it is designed to be user friendly, even if employing a maximum size UK. The encryption speed of the cipher is accomplished by doing the most complex and time-consuming work of UK Setup and PadGen in advance of file encryption.

A large UK sets the limit of a cipher's strength. But that serves only to force codebreakers to try anything other than a brute force attack on a cipher. Every cipher must be able to withstand all other possible attacks, such as frequency analysis.

Indeterminable pseudo random pads, as many as needed, of $2^{23}$, or 8,388,608 bits each, are automatically generated and distributed to users for encryption and decryption. The pads made by the cipher may be distinguishable from true random pads, but since indeterminable it is inconsequential. The pads are automatically distributed since all those using the same UK will generate identical pads automatically identical to the pads of every other member in a circle.

Figure 13:
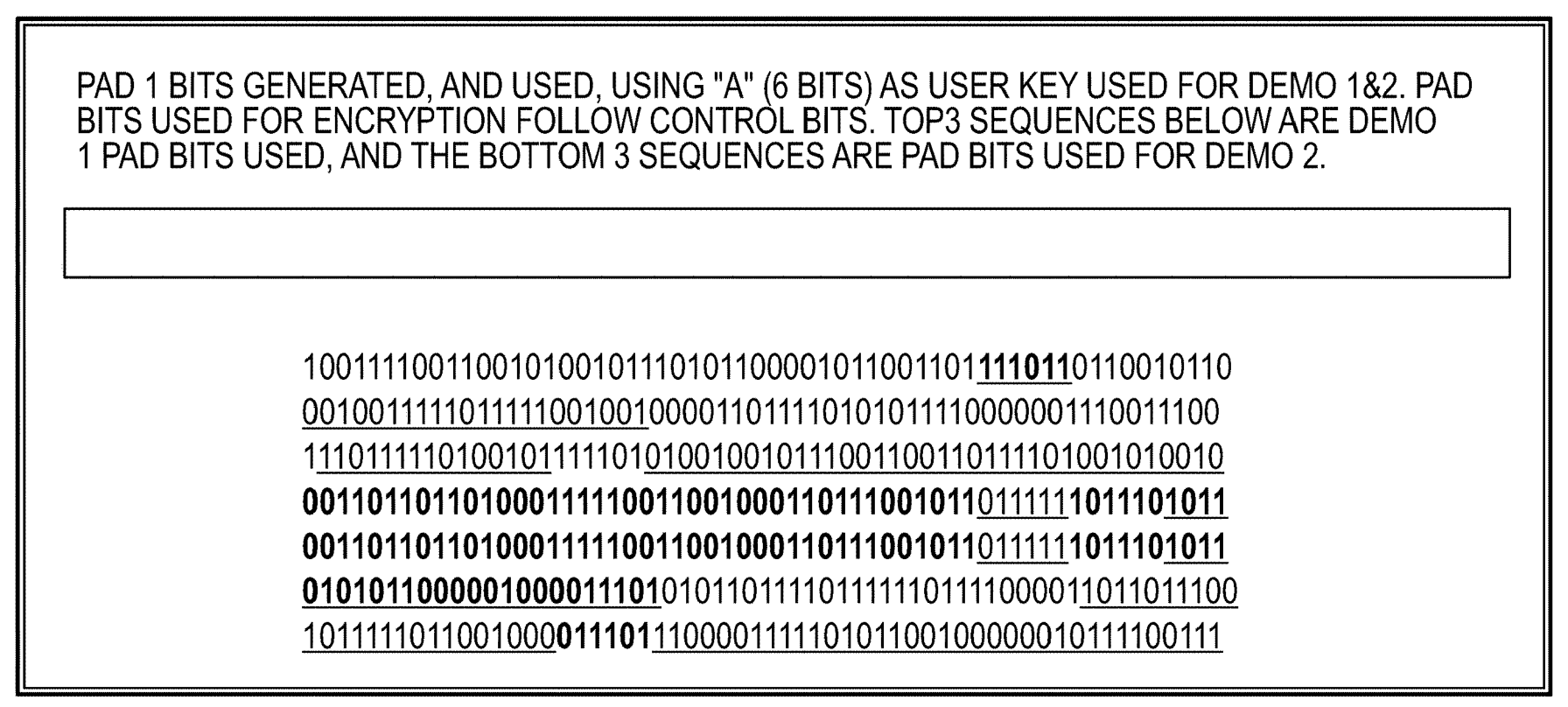

FIG. 13 depicts a sequence of pad 1 bits generated in demonstration and 2. The top sequences are Demo 1 pad bit and the bottom three sequences re pad bits used for Demo 2. FIG. 14 is a table that summarizes the encryption configuration values used that includes a listing of the function, the bit count and exemplary bit sequences from the pad bits. Secure Transmission and Storage of Files Using Communication Devices, Displayed on a Monitor or Audio, Using a Complex Pad Cipher.

The cipher of the invention makes a brute force attack the only attack that could possibly succeed. But if a large UK is selected a brute force will fail since too much computer power and time would be required.

PSP Operations

When p-text bits are combined with pad bits they are then c-text bits. When the c-text bits are converted into c-text characters (0-9, A-Z, a-z, +, / 6 bits at a time as determined by program #, and six bit modifier. The program number used for encryption and 6 bit modifier are in pad bits relative to the 42 bit PPS sequence. Prime Set Permutation rearranges the order of the c-text characters. The numbers for the start and jump to PSP the c-text sequence is also in pad bits relative to the PPS sequence in pad.

Twenty-six bits for start and 26 bits for jump, using wrap around for sequences having less than 2^26, or 67,108,864, c-text characters. Permuting, or rearranging, the c-text characters in this way greatly complicates discovering the correct order of c-text characters so that the correct order of the c-text bit sequence can be discovered, which is required to reverse the encryption process.

The PPS is a 42 bit sequence within pads that have been generated. In an example, they are converted into 7 PPS char's (64 possible, same as c-text char set.) When the 7 c-text characters are removed from their 7 position numbers, determined by 26 bits each using wrap around, each c-text char is converted to their unique bit sequence found during the UserKey Setup process.

When all 7 PPS characters are in correct order and each converted to their correct 6 bits for each char you have your full 42 bit PPS that will be in pad bits used for encryption.

42 PPS bits ensures that the PPS sequence will be unique within pads by over 4 Trillion to one odds by 2^42. When the PPS is found all the other control bits needed and pad bits needed for encryption and decryption are located. The PPS points to them.

The odds of finding a duplicate 42 bit sequence during decryption that then yields wrong control bits and wrong pad is remote. If it ever happened you'd simply get gibberish when attempting to decrypt. Referring now to FIG. 9A the PSP operation is illustrated when ghost character! is removed from the sequence. Starts point and jumps in the starting sequence are determined using wrap around equivalent values for c-text seq's composed of less than 2^26 characters. PSP permutes all the c-text characters of a file at once, regardless of the file size. Here, since the next prime is always calculated and used for the permutation, a single ghost character was used. Ghost characters are removed when PSP is complete.

As shown in FIG. 9B, the PSP process is implemented on an 8 character sequence. At step 990 six bit random values are assigned by the random program number out of 64 possible for each character in the sequence. At step 992, three host characters are added in order to make the sequence have a prime number, in this case, 11. Next, at step 994 the start point and jump point is determined from the pad. The fourth step 996 as illustrated in FIG. 9C, applies the permutation at the selected start point to the sequence. Finally, still refer to FIG. 9C, the fifth step 998 involves the removal of the three ghost characters. The rearranged order of characters after PSP looks just as random before PSP as after it. BGHFACDE before PSP and GAEHCBFD when PSP is finished. Codebreakers will not be able to tell when the order is correct.

PSP reversal requires that only the prime characters are used, while 8 random characters are mixed into all c-text character sequences, after PSP is completed, in two numbered positions. One block of 7 char's together and another single character randomly positioned. Without first removing the correct 8 random characters in the c-text sequence, during decryption, the PSP reversal process cannot be performed. The result is a hard problem for codebreakers. During decryption, PSP is reversed and then each c-text character is converted to the correct six bits. The cipher software determines which program is randomly used out of 64 possible and each has a random bit assignment table for the 64 c-text characters. The bit assignments for the program are also modified randomly by six bits for every file encrypted to increase variability.

Without reversing PSP, codebreakers will not be able to get the c-text character stream in correct order for decryption. But even if they could do so, they would then have to determine what pad bits were used to encrypt the p-text bits.

As a variant a First Step Only, Fast, version of the cipher, p-text combined with pad, can also work for greatest speed, with the 42 PPS bits, mixed into the c-text bit sequence, as desired. This variant, with minimal complexity, would work fastest if the 42 PPS bits are inserted as a group.

A variant of the cipher could add more bits than those needed to ensure perfect divisibility by six. Each added divisibility bit inserted into a numbered position unknown to codebreakers complicates discovering the pure p-text bit sequence. Since each insertion offsets every true six-bit chunk that follows before conversion to c-text characters.

The key size is also scalable. It could easily be made smaller or be increased to over $2^{27}$ bits, if desired with neither affecting encryption speed. Only UK Setup and PadGen would be slowed by increasing UK size, with PadGen being the most significantly slowed. It is important to note that although the pads generated by the cipher are pseudorandom, they are also indeterminable. And if indeterminable, the pseudorandom sequence masks the identity of p-text bit sequences after logical combining just as effectively as a true random sequence, for encryption of a single file.

C-text consists of 64 characters, 0-9, A-Z, a-z, +, and /. The use of the "+", dagger character is unique to the SPAE cipher for c-text. Other ciphers commonly use "+", the plus character, instead. Seeing the "+", dagger character it in c-text would ensure that SPAE cipher encryption was used.

Each of the 64 characters in a c-text sequence represents a unique 6-bit string assignment. A c-text file will always appear to be a random mix of the 64 c-text characters, whether a small or large UK is chosen. Files encrypted with only six bits will have c-text that appears as random as the same file encrypted with a $2^{27}$ bit key. Even the size of the UK chosen for encryption will likely be indeterminable by c-text evaluation alone.

The constantly varying position and character assignment of the PSP lock makes its detection for removal completely improbable. With its random insertion into the c-text sequence it also complicates discovery of the seven fixed position PPS c-text characters by constantly offsetting their position, randomly. Pad bits used for encryption of p-text bits, or control, are used only once. Since none of the characters of an encrypted file, whether c-text, PSP lock character, or PPS characters have known character to bit conversion assignments codebreakers are again faced with a very hard, to impossible, problem.

The control characters, 7 for PPS and 1 for PSP lock, in the first embodiment may also number more or less than the eight total in other cipher variants.

In an embodiment variant the bit representations for the p-text to c-text character conversion could be converted by more than one conversion table by a variable percentage of p-text bits converted by one table and remaining bits converted by one or more others, with percentage determined by pad bits. This variant would dramatically increase the difficulty faced by codebreakers, since PSP would then mix all the different c-text characters with different conversions done throughout the entire c-text sequence during PSP.

A cipher variant could also use block permutation instead of PSP or use a combination of the two.

Decryption Example Shown

The following is a detailed description of 744 text characters in a Notepad file encrypted three times resulting in 1,000 c-text characters, for each encryption. They were also encrypted with the same UK using a typical UK of $2^{23}$ bits. The difficulties of trying to decrypt the files without having the UK are presented in order to better understand the encryption and decryption processes.

In the resulting 1,000 c-text character sequence shown the seven c-text characters of the PPS are always in the same numbered positions using wrap around, determined by UK Setup, by 26 bits for each.

The 42 bit PPS sequence has a separate bit representation table for each of the seven PPS characters. As depicted in FIG. 15, the cipher version disclosed has a separate random conversion table for each of the 7 PPS characters, with tables determined by user key ("UK") UKSetup.

The 42 bits converted to c-text characters are determined from pad bits. The 7 unique bit to character conversion tables are also determined during UK Setup with 64 factorial possible combinations for each table. When the 7 PPS characters are converted to their 42-bit sequence they then point to the control bits and pad bits used for encryption of the file.

Referring now once again to FIG. 1 during decryption the 42-bit PPS sequence must first be located in pads to decrypt the encrypted file at step 155.

Note the typical randomness of c-text characters with control characters mixed in. The randomness is always present, despite file encrypted, or UK chosen to encrypt.

Below is the first encryption of the small Notepad file.
gp5wzgF304kUTAS4ONCji0eQhAJuRqo4rvBQrZ78
ySgijWmys00to3faDG1o
R1X6WDnbguHW01GWoYq1wpZ7LUDnkRZCDOzI
rWXkmBfJyMC9GVrht1N
7hdqehnfQf9ttZ38UydnD8uX9oGAogHd9t1G08L5eJ
9JVZvOvgWy58VkAiln
L1T3Xwil1WCyP6Wx05mkGr7DwuBvBTvWPQOW
LAaRTHums1GzU4YTc
mxWFM39cJIQTCuE108f4HuUPSiJ8i9tSTE6IIqGMx
HNBScZD SJLg8pBQtj b941gpa07BSyVf2B14CUeY/
XCrTu7RCofLuPZ1XJij4hyeYjfNZQCWffD0luE
fMcdHsK9d8R0jD4sSPE8c8vLvf5j9dBZL7ryb508W
mvYQOD4UHZXD8w
Me8QHM8hIVtXYihVh8lTEWjb30sSspz1fL/
6RVpD3P43Ye0qHWncxDXSA 4tqef76ZMYsKrxwa/
gIVFkNIf7ULGt8831WUxErec1XKZAtFZHRrQqmcffh
Wq6utHOixxAFPCQZNWZzvs7dsMKUNS1HSRY
Mgkx8SMK2FbwKXfGfy
EgkZZBORWHYVPcAdbl73flfZ14NDgLbtBTm7qr
MwSqE993oyf5o9Vt64c
X2jP5AsAdrkytHOjq6HYewPA65APzHZkjVqLGF
XRfEu0a5LIvGLmih9EXD
nnefOJsxzfnDXaxPsoMTIraA7mN6BoewH4waSgd
QQGoJdffLrHUBYRbAr
gh9phwcI4m9f40fMtT3JOBjywh8iYl1yPg1Z5aQq
GsL486ZKhtE6FbKIQBD
rRttLzo01C1Fq0n64dmb3RTU4BRCZDwbNXiYly0N ORTZPL1LAQvr8KNDR
gxyCrOFT25YX3YOHgyebGwEtwGTprgbau6ftJQQ4
SS1rdsoDmPigFBl1Jk
AQZBHYRHGOKkH4SGSWxR9xtrhe
2vaUNoocIc2onuIN7hdxnjAXPRfB2BG
GCCcoNnz5hCflAKfikf5G.

To decrypt, first remove the correct 7 c-text characters that were inserted into the c-text sequence above at 7 different position numbers. These are the PPS characters and will vary randomly for every file encrypted, since they are determined by pad bits, for only that purpose.

Next, as shown in step 157, the removal of the PSP-lock character from the c-text that is in a constantly varying random numbered position, inserted into 226 possible positions, with character assignment by 6 pad bits and a unique conversion table is located by the 26 pad bits and removed.

Only after the correct 8 control characters in this software version, have been removed from the 1,000 c-text characters above can the order of characters be corrected for the remaining 992 characters. Roughly 984,000, possible permutations in this small file, permuted by PSP. When correctly ordered it will look just as disordered as it is in the c-text sequence above. Reversing PSP requires using the correct 52 bits, therefore 252 possible combinations, by 26 bits for start and 26 bits for jump.

Next, determine what each of the c-text character bit representations are using the correct conversion table for the program number used to encrypt and six bit modifier, both in pad bits, to convert the 992 c-text character sequence to the correct 5,952 bit sequence. There are over 64 factorial possible combinations, for every table used, with 64 unique tables by program number, with only one table that is used in this embodiment of the cipher.

Finally, if a codebreaker succeeds in solving all of the problems above, one more remains. The encrypted 5,952 bit sequence needs decryption. This step, 163, requires that the correct pad bit sequence, of the same length, to be logically combined with it using XOR. With this small file there would be 25,952 possible bits sequences to try. Only one of them will convert the 5,952 bits into the same bit sequence that it was before encryption. The extra bits are removed at step 165 and the file is then displayed or stored at step 167.

A second encryption is performed below using the same UK to encrypt the same 744 character Notepad file to appreciate the c-text differences. All three of the c-texts made have only the number of 1,000 c-text characters in common. Other than that number they are completely different from one another.

o7u5/FT4mC17Ib1Pst6jsiP8RSq4pndMMSoPmOPXm
Kd9saCNFqEA2q
W7At04K5ua19ymzGeoAXhm189XDBDLlzm
QcLRfeVCZ4VIL/GqqwLs
VPA1bYfPNPx5v4ITmGYc1XwVFP9QECOhis/
2mhwVE6qC49KFHTFV 1PFmESK7PvnumXvq1i99JBa/
cA0TxwUx2/UFpU4qkX4V1bIMR8ND/Tv
QZmP88Q0c3R1HxVNAGmii1n3rSDqC5XI
DqIibkaagg0b53MiCjoujbZZ tbAEPrafo-
bRPQhehFGpHsGWXUydMCbWg
raCdSRUHkwV1L9tF9LXx3kKaSXSGWL/
K8WVwa2FX6fcNzuiLRIz0yONiZAKPNNruUZ
ct3WGoPn hMfUg2PxPMr6WrDfsgt034efXlpOazi4icmmq
T6VOEBbvy8xcvcFWNb0f
8FMTm2Z4flrulKIBz4PdX5bFwrIhxgM8iHx
1npiJ72YC33sTbkvV7JNvg S/L7LQ++
JGxy9PkeLffUDBZZcVquhhMh7i3
dyUTeilpyppDLGrpgzWkh q5dD/
HOCtGT9r3601S131YgEx2yTqHc12b Nt3WgwpEwKsjNEZa35N/
h9TPDQtEoOYcltN1XexE4PhHX9nc4t
cHMXEKiqqXrirheI3rmowlUipbk1P04FUom
sStXga7TVNQbGiNlcXCsUbegePYZ9XaGIBz
W5VjOBjEOqtAr GaJCYRGi/
sodaJYgORiGZ1JLUjrhUajrrnIOhJWyOwt
aC190GZAXDdD
mTap7aCnluvadeUZru1S1qXjrsV3UZY6At
OVZGhFnO5A9B7h4Q1R1c4i 2rggZoF54K41f7No/
iqsvhYsp21qb/UtEwV2FnorB/j2LYK42SMzurz8kM
KVp8SIiZ/70CGu4Clwy97/6b3MI/
tmLXNrbMjc6YUsn1s8X34Q/xLtSEXs
CFdVJJoki1x2b1bOha5mTQ8g15rEBIK
ZsSIne9LXmlrQ577U72kPNAJc m1

And finally, the notepad file is encrypted a 3rd time below, again using the same UK and same Notepad file, resulting in a completely different c-text character sequence again, for comparison.

67j8QE/QSLzPqSKQDCMPlteMEeSM88N1fiK
B62W7Sb3C9uzy
3nW8tXgAHrwbddJidYoHwsf2aw7wJt
Qyou2VviGR3WhRFSp2pLm5†4dk†L56f
o4CzFOBsUWCH9ApeG4IR2pQ2KnCB4xmCchi
fgAVkszvOZ0JUfWxOtIFms4yKe0Tr/
ljVtp68X8dFeat†QTS†z7†diI1OmGp/
uf†8Pz6awusTaLWxVmnHxtoDnHWSoE7sEAiqzuw
vmJaKtJC1GqRpzRh4U5cOOT3NvBW
xX6DnIXJx509saYfwqNg
uZuKnpGTaLNuqW7UVF3RQHqA6†
fTIRq57Pw2HYk4HpyKBo
ZWVDOSeGA0M8rgDJK3jRAiN8gFBfwG/e/
vulkQBi†M2UYjCSr
uIUkzlqdY7YRf3oiOqi5QzGE5UwCy
pRrbZLotg9Tgim†rpfhiX4rL0mwfxpjn
ZWyJu1qIglwW1CubbLs3hulG1h/7YC5ifXLK1YO
HYJsR3duHCqWXP36x89iOzACQNbb
xBnNGThHuudiQU0hvd
2Q/NOGAbeRn57sDetK0RzB6qudSILD3D/
vBnPEG1TRngHFqg8
71†suSDU86hzUujWmErzNv001wn
TeC5sgFX†iXyyGO4mblo/†P
USIybeA0EeVvEMYSdZu/hBGXqXpDY/
BrgrJcbltjgn84V5edlyr9J
XJLX3FebQGqFInAo4WETWVJ1dtn
Ui7f6A9Xeg6Ru1gBxJquNgz
a8a14URa4W7WQTb058ktfc9cxVoZX
09nbQ†5Lt1PZMYXzQSIe6OsJDuOm
ODO3M12eyg5//2edqmiWlxZXPgehCF/
Blc0ByELT2W
IQ0ibskogqPdWadOvrQGoW6PxI7hFt
hkrywg8HNRvZLTZ15m eZiuRevM1Rpl4p5DZW28/
IayDNM1thsY9KM5dktEEIC9N07rtfB e†n†Ljeulcp-
chUIl The three encryption examples above show the randomness of each c-text made and that each c-text file will always be completely different, even if repeated a million or more times, while decrypting to the same file each time, due to the many variables.

The Decryption Steps Explained Further Decryption simply reverses the encryption procedures in the correct steps. In the file being decrypted each of the seven PPS characters are located by their individual numbered position numbers, within the c-text sequence, and removed. They are then each converted, in their proper order, to their appropriate bit sequence using the correct unique 7 conversion tables each one was assigned during UK Setup. Then the PPS, as a 42 bit sequence from pads, points to the pad bits used to encrypt the file, as well as all control bits used for that file being encrypted. Using the PPS bit sequence in pads the position number of the PSP lock character position number is found from 26 pad bits. The PSP lock character is then identified and removed from the c-text character sequence, and discarded, leaving only c-text characters without control characters, in an order that is incorrect, since PSP'd.

At step 159, after the PSP lock character is removed, the next step is to correctly order the c-text character sequence by reversing PSP. The start and jump numbers that were used to PSP the sequence are determined by pad bits, with respect to the PPS. The correct start and jump bits, 26 bits for each, in pad are then used to reverse the PSP.

After PSP reversal the c-text characters are once again back in their correct sequential order even though the sequence will look no less random. Only then can each character be converted to its correct six-bit representation based on the program number that determines conversion table used to encrypt and six-bit modifier, both in pad bits as illustrated in Step 161.

After these steps are successfully performed what remains is a c-text bit sequence in correct order that must be decrypted. The encrypted bit stream is now decrypted by XOR with the same bit sequence, from pad, that was used to encrypt it, once again pointed to by the PPS bit sequence.

At this point the extra bits, if any, that were added for perfect divisibility by six, are identified and discarded from the front of the bit sequence. Now the bits remaining are only pure p-text bits in correct order. It would be the same bit sequence that was first encrypted. From the file name, the file type is known so the bit sequence is converted back to the original file which may then be viewed/and or saved, or opened, as desired.

In a variant, pads generated can be disguised by rearrangement, PSP, and/or conversion to characters by one or more conversion tables, known only to the individual device user to enhance End Security. If the recommendations for using the SPAE cipher are followed the Transmission Security is already assured.

The PadGen Steps

The PadGen steps, which create the bits, involves many operations and is labor intensive. Pad makeup is also made more difficult since every new $2^{23}$ bit pad uses the previous pad as part of the generation process for the current pad being made. For example, if a file is encrypted with pad 101, a codebreaker would have to know pads 1-100 to recreate pad 101 using the PadGen process. A variant of the cipher could also be made without this feature of previous pad being used as part of PadGen. The variant would allow any pads made easier to reproduce.

The SPAE cipher has a complex PadGen Module. It uses pseudorandom sequences to generate more pseudo-random bit sequences, pseudo-randomly. The cipher begins with using eight true random sequences built into the cipher to randomize short sequences and/or sequences entered as a UK that are not very random. This results in consistently high-quality pads generated, despite the UK chosen.

PadGen involves a complex combination and condensation of 16 high quality $2^{23}$ bit sequences to make the first pad for that UK. The two columns of eight $2^{23}$ bit sequences each are combined using XOR or XNOR and condensed first by rows, left to right, and then by the single column remaining, top to bottom, until the first pad, of $2^{23}$ bits remains.

Figure 3:
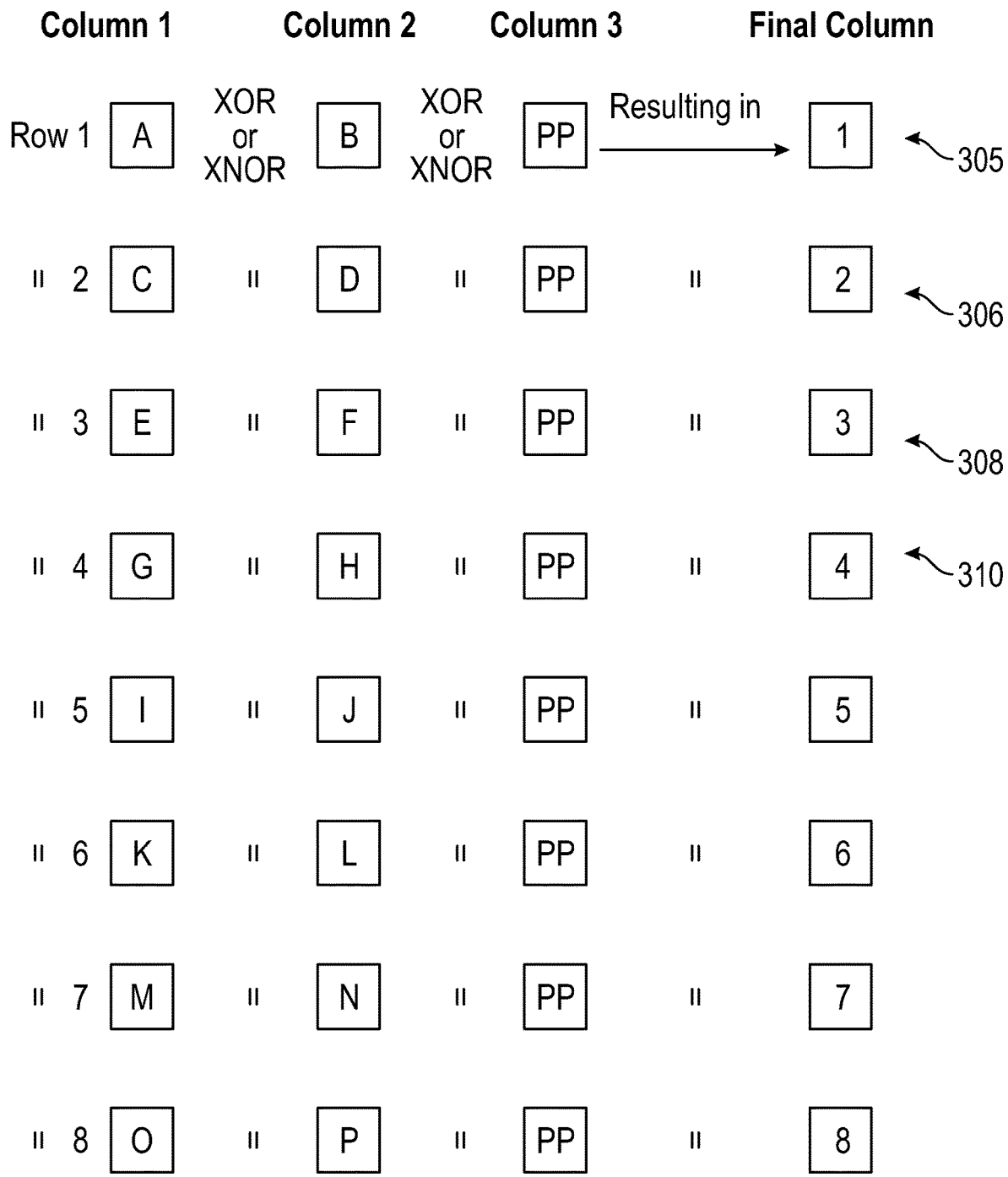
FIG. 3 is chart illustrating a manner to generate a second pad and all pads that follow according to methods of the invention.

Referring now to FIG. 3, the generation of Pad 2 and greater involves adding a 3rd column of $2^{23}$ bit sequences that are the previous pad. As seen in row 305, this requires combining, using XOR or XNOR, the three columns of bit sequences left to right by rows first, and then top to bottom for rows 306, 308, 310 for the final column in row 8 until a single $2^{23}$ bit sequence remains of pad.

Automatic pad distribution is accomplished since pads created by a UK in a circle with up to 32 members will always be identical to one another.

Pads generated are random. An analysis of runs of 0's and 1's is statistically the same as true random sequences. But they are pseudorandom since that property is required for reproducing them as needed. The bit sequences used to logically combine with p-text bits are just as effective as true random sequences used for encryption, since indeterminable. The SPAE cipher has an advantage since pseudorandom sequences can be reproduced while true random sequences cannot be reproduced.

As a final PadGen step the $2^{23}$ pad bit sequence being generated is rearranged 512 bits at a time using block permutation. The random rearrangement order is determined during UK Setup. The random arrangement of the 0-511 numbers in binary are also modified by the last nine bits of the pad number in binary using XOR, prior to use.

Pads are $2^{23}$ bits long and must pass two tests before being accepted as pads and used for encryption. The first, is that they are relatively balanced in the number of 0's and 1's that they're comprised of, within 1 standard deviations, 1SD, of one another. Second, they must also be unique to all other pads previously generated for each circle. This is verified by examining the first 42 bits of each pad generated for uniqueness. If a new pad fails either test, it is not used but discarded and a new pad is generated to replace it.

Using pads as an integral part a cipher's operation may be the only way to effectively have large enough UKs to ensure security for centuries, rather than decades.

After the random sequences have been used to randomize the UK chosen those eight random sequences are modified using a rearrange procedure, to create eight more random sequences like them, resulting in a total of 16 sequences each having $2^{23}$ bits, in two columns before combining and condensing down into a single pad sequence of $2^{23}$ bits. Obviously, a maximum size key of 16 sequences, each $2^{23}$ bits long, in the proposed cipher will be the most difficult for a codebreaker to determine, with $2^{27}$ total unknown UK bits.

For every $2^{23}$ bit binary sequence, nine or greater, submitted for a UK the number of true random sequences used in PadGen decreases. If 9 sequences of $2^{23}$ bits each are submitted for UK then only 7 of the true random sequences are used and if 10 then only 6, and if 16 submitted then none of the eight true random sequences are used in the PadGen process, with the user trusted to follow recommendations for selecting good binary sequences for strong UKs, that don't need further randomizing.

After the UK is submitted, it is ExpandedXOR'd with the eight random $2^{23}$ bit sequences within the program to modify them and provide the 16 sequence PadGen structure, which has two columns of eight sequences, $2^{23}$ bits each. Just prior to the first two columns of sequences being combined first by rows and then by columns into a single sequence of pad the leading 52 bits for each leftmost column is stored for performing PSP on each of the sequences before generation of the next pad begins. In like manner the first 23 bits of each of the eight sequences in the $2^{nd}$ column are stored to perform a simple bit sequence rearrange before being used in the next PadGen. With PSP using 23 bits for start and 23 bits for jump to rearrange column 1 sequences and the 23 bits for each used to simply rearrange the 2nd column sequence by randomly changing the starting point in the sequence and moving the characters left of it to the rear of the sequence. With all 16 sequences modified in this way prior to each new PadGen beginning the randomness is continually refreshed, and ensured, especially considering when the previous pad is used in the 3rd column for PadGen.

Sequences are first logically combined using XOR and or XNOR in rows left to right with the leftmost sequence bit determining XOR is used if 1, and XNOR if 0. When the single column of sequences are being combined top to bottom the first bit of the top sequence determines whether XOR or XNOR is used, in the same way. When all rows are combined the final, rightmost, column of eight $2^{23}$ sequences are combined top to bottom using XOR or XNOR until a single $2^{23}$ sequence remains. Block permutation 512 bits at a time is then performed. If it passes the 1SD and uniqueness tests it is accepted as a pad.

Once set up, the pad generating process is self-generating. Pseudo randomness generates continuous indeterminable pseudo random sequences. Generating as many $2^{23}$ pads as needed for a lifetime of secure encryption.

PadGen Principles and Operation.

UKs are identical for all Circle-members and therefore create identical pads for all Circle members, with 32 members now set as the member limit for each Circle.

In an example, using a Hewlett Packard Envy laptop, it takes about ten minutes for the software to generate 120 unique pads, $2^{23}$ bits each, which is over a Billion Bits. If they are being used by a Communication Circle with two members, then files encrypted by member 1 of the circle has the SPAE software automatically using odd numbered pads for encryption, 1 3 5 and so on, while files encrypted by member 2 would always use even pad numbers generated, 2, 4, 6 etc.

For a three-member circle, member 1 pad usage would be pad 1, 4, 7 and so on with member 2 using pads 2, 5, 8 and so on . . . and member 3 using pads 3, 6, 9 and so on. When decrypting a file correctly identifying the member number who encrypted it makes finding the pad(s) used to encrypt faster. That is why during decryption the software requests "who in the circle encrypted the file received?"

Pad number assignment use is unique for each circle member encrypting ensuring that no pad bit sequence is ever used more than once to encrypt a file.

Pad usage for each member number in a circle has a unique usage pattern for each member. Ensuring each member always uses pads assigned to them for encryption. This ensures that pad bits used for encryption are always done using pad and control bits never used before for a circle. This is a security requirement for a One Time Pad cipher, and it is ensured by the SPAE cipher as well.

PSP: An Example.

If the four elements in a set are ABCD, they are not prime. To rearrange them using PSP 1st a ghost character of * is added giving the sequence five elements, now prime, changed to ABCD*. If a start of 2 is randomly selected along with a jump of 2 then the elements are rearranged starting at C, since the starting position for 0 is A, and 1 for B. Then a jump of two characters treating the sequence as a ring results in the rearranged sequence of C*BDA. After rearranging any ghost character(s) are removed leaving CBDA, in this example, as the permuted sequence using PSP.

A variant of the cipher might use more than one PSP permutation procedure on a file being encrypted by dividing up the c-text character sequence into sections and using different start and jump numbers for each section, with sections determined by pad bits and/or program number used.

The file name automatically assigned to the newly encrypted file is the first seven c-text characters of the c-text, the number of bits added to make the p-text bits perfectly divisible by 6, the original file extension, and finally the proposed cipher extension of four characters to follow in the cipher: Rev 0 of the SPAE cipher will have the extension "spae" and rev 1 will be spaE, and rev 2 as spAe, and so on using capitalization of the four characters to indicate rev 0-15, with lower case representing 0's and capital letters as 1's of standard bit value to decimal conversion.

ExpandedXOR ("ExpXOR") Operation

ExpXOR is used to combine two binary sequences. It takes the shorter file and takes as many copies of it as needed, along with partial copy as needed, to make it the same length as the long file. Once expanded the two files are of equal length and they are logically combined using XOR.

For example: Expanded XOR operation of the two seq's below:

1010101

110 begins with expanding the lower, smaller, file, to 1101101, which then leaves 1010101 to XOR with 1101101, with the last 1 as a partial copy of the short file, after expansion.

1010101
1101101

The result is 0111000 after combining using XOR.

UK Setup

Many conversion tables and permutation arrangements are needed for the SPAE cipher. This is how they are determined. There are eight unique true random $2^{23}$ bit long sequences that are from the random.org_website within the cipher. When a user enters their UK, if short, these are logically combined with the bits they entered using expanded XOR, to randomize them.

The resulting 16 randomized bit sequences, each $2^{23}$ long, are used during UK Setup and PadGen. Each being unique, each thoroughly randomized. Even if the user chooses a short, weak, UK.

Bits collected during UK Setup are collected from randomized UK bits starting with randomized sequence 1 and proceeding through the 16 sequences until complete.

The bits needed for the 64 programs determining bit to c-text character conversion are one of many random settings needed. They are collected six bits at a time and checked for uniqueness until each program has its unique 0-63 bit arrangement for each program. 24,576 bits needed for that alone. The randomness is designed to frustrate useful frequency analysis of c-texts.

46 bits needed x8 for eight of the sequences to have PSP and 23x8 to rearrange the other eight sequences are also collected for ensuring pads generated vary from the start, until each sequence provides its own bits for modification during PadGen. Ensuring that all 16 PadGen sequences change dynamically before every new pad is generated.

End Security

Further cipher variants employ pad disguising to improve End Security. One way is to disguise pad bits by adding more than the bits needed for perfect divisibility by six in position numbers. These offset the true p-text or c-text bit sequences of six-bit chunks prior to conversion to c-text characters. The pad sequences would be unique in appearance even though identical for purposes of encryption and decryption once returned to original bit form, even among circle members using the same UK. A simple rearrange and/or a PSP, and/or a bit to character conversion, could also be performed. If pads were left in this disguised state, unless being used to encrypt or decrypt, they would be more secure from an End Security standpoint.

Active User Session

Encryption, Decryption, and PadGen can only be done when a circle is in an active session. In the first version of SPAE an active session occurs when a user correctly enters a UK for a circle that is verified by it matching a hash function stored in memory.

In a cipher variant the UK submitted to activate a session would have an additional requirement. The UK submitted would be used to generate pad1 to count the runs of 1's in it for singles, pairs, and so on through strings of seven 1's. Requiring both a correct hash function for the UK and the correct count for each of the seven run numbers for 1's, from single occurrences to strings of seven. This would help ensure that a UK submitted is exactly correct before activating a user session.

The PadGen Process

PadGen is designed to produce indeterminable bit sequences, with $2^{23}$ bits each per pad, regardless of whether a user chooses only a six-bit UK (UK) or a maximum User UK of $2^{27}$ bits, or any number in between. It does so by using true randomness to ensure indeterminable pseudo-random pads are created, regardless of UK size, with pads having $2^{23}$ bits. The method used to create Pad 1 and subsequent pads is illustrated FIGS. 2 and 3.

Keys entered are first randomized by being combined with eight unique true random bit sequences within the software that came from Random.org. If the UK chosen is not long, less than $2^{23}$ bits, it is expanded before being XOR'd with the true random sequences to form eight new randomized sequences. The eight randomized sequences are then each used to make an additional eight $2^{23}$ sequences resulting in two columns of eight $2^{23}$ bit sequences each, ready to be combined to form a single first pad, $2^{23}$ bits long.

The eight sequences are then modified by random bits collected during UK Setup. One column of sequences each rearranged in $2^{23}$ ways by a new starting point in the sequence being chosen with remaining bits moved to the tail of the new, modified, sequence.

If there are eight or less $2^{23}$ bit UK sequences selected the eight sequences in the other column are each permuted using PSP, also using numbers randomly found during UK Setup. Each sequence in the 2nd column rearranged using PSP with 23 bits used to determine both start and jump numbers. If 16 seq's of $2^{23}$ bits are chosen as a UK then there is no expanded XOR operation performed. The 16 seq's, each $2^{23}$ bits long are used, unmodified, for columns 1 and 2 of PadGen with the 8 true random seq's in SPAE software not used. They are immediately ready for PadGen. When 16 binary sequences of $2^{23}$ bits each, are chosen as a UK they also have an obvious advantage of offering no information whatsoever to codebreakers for the internal workings of the PadGen process.

Figure 2:
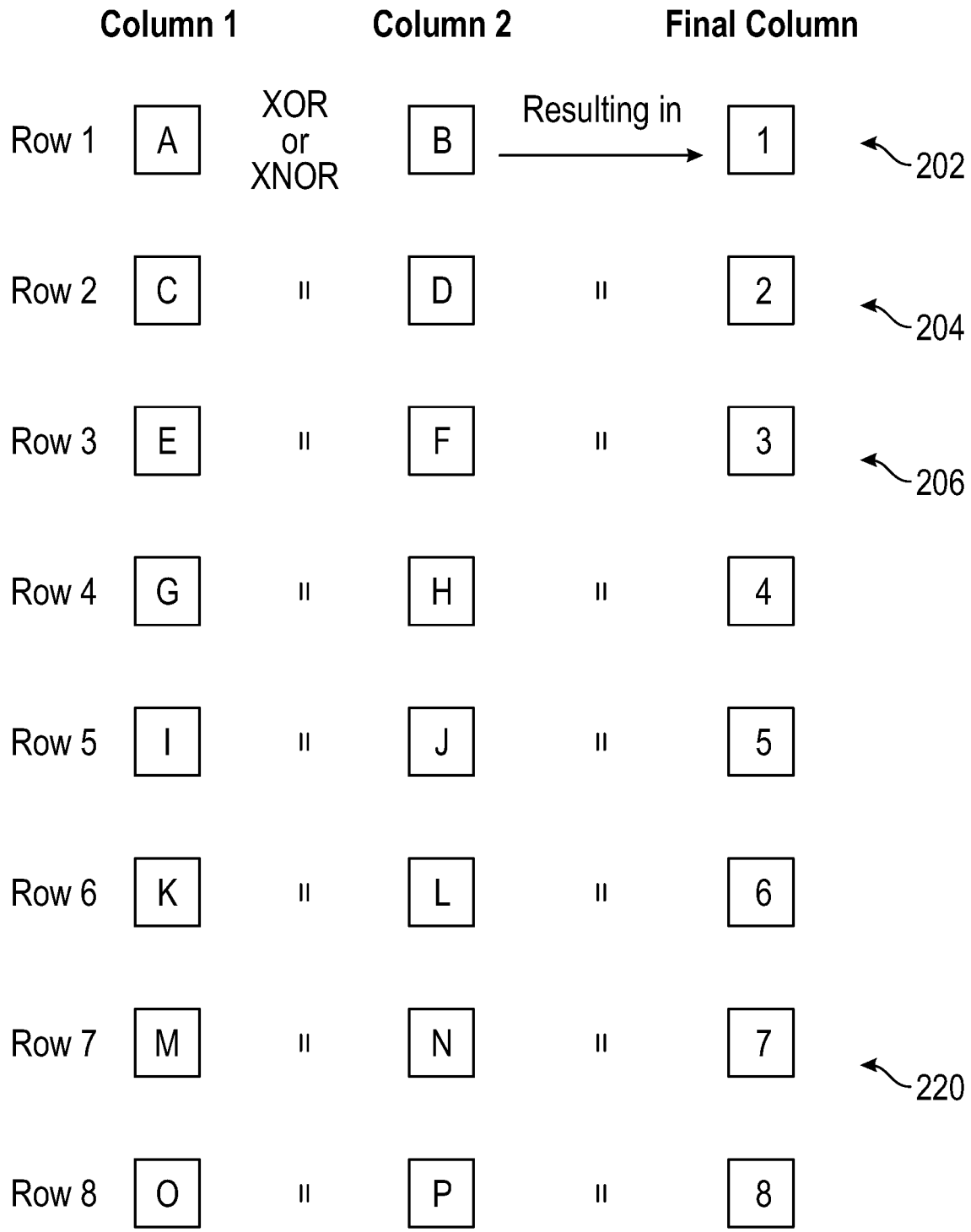
FIG. 2 is chart illustrating a manner to generate a first pad according to methods of the invention.

As shown in FIG. 2, to make the first pad the eight sequences of the first column are then combined using XOR or XNOR depending on the first bit of the left or first column sequence, combining rows first, until a single column of eight sequences remains. Then those eight sequences are combined using XOR or XNOR depending on the leading bit of the top sequence. So, the top sequence 202 is combined with the sequence below it. The resulting sequence lead bit is then examined to determine whether XOR or XNOR is used again to combine with the sequence below it. This continues until only a single $2^{23}$ bit sequence remains.

One final step is to take 512 pad bits at a time and permute them based upon UK Setup derived from the UK entered. This results in 512 factorial possible combinations that act as a final complicating factor making PadGen reversal a very hard problem. The random 9 bit arrangement (000000000-111111111), 512 unique arrangements, determined by UK Setup makes the last operation on pad sequences randomness generated more certain. Especially since the unique base 512 bit arrangements are XOR'd with the last 9 bits of every pad number being generated, guaranteeing that the final modification step for PadGen will only use the same 512 possible arrangement every 512 pads made. The final block permutation rearranges 512 bits at a time in this block permutation until all $2^{23}$ pad bits are permuted. Then only the two quality tests for the pad remain for it to pass and be added to other pads made. If for example the UK Setup has 000000011 and 000000100 as the first two base sequences of the 512 then if making pad 1 those two sequences would both be XORd with 000000001 resulting in the first two numbers to 000000010 and 000000101 for permutation for pad 1. Resulting in the first bit of pad 1 being moved to location 2, and the 2nd bit to location 5, after converting to decimal, and so on for all 512 bits. When making the 2nd pad the base sequence unique 9 bit arrangements would first be modified by XOR with 000000010, or 2 in decimal. This procedure permutes all 512 unique arrangements but leaves a different 512 arrangement when completed. This modification is done on all 512 unique numbers and stored so that it may be used to block rearrange all 512 bits before doing the same to the next block and repeating until the entire $2^{23}$ bit sequence has been permuted. It takes 16,384 blocks total to rearrange the entire sequence of $2^{23}$ bits this way, 512 bits at a time.

When block permutation is completed, in this example above,

Pad 1 is generated, and it is accepted if it first passes the test below that counts 1's, to show relative balance of 1's and 0's within 1SD. The count of 1's must be in the range of (1,430,257-5,624,561), and that $2^{23}$ bit sequence is not identical to any pad previously made for that circle, by spot checking the first 42 bits of the pad. If it fails either test, a sequence in the column is modified and the PadGen for that pad number begins again. And at the end the resulting pad must pass the two tests to be accepted or another sequence change is made and the PadGen process begins anew until both tests pass.

Referring now to FIG. 3, Pads made that follow Pad 1 only differ in generation in two ways. First that the rearrangement numbers and PSP numbers used come from the 16 prior sequences themselves made before, just prior to them being combined first in rows and then in columns until all the columns of sequences are condensed into a single $2^{23}$ bit sequence.

Second, the other difference in PadGen for Pad2 and all pads that follow is that a 3rd column of sequences, column 3, is added, which is the previous pad made for each row, 305, 306, 308, etc. So, the eight rows now have three seq's to be combined until one remains before a single Final Colum of sequences is combined top to bottom, as before, resulting in a single $2^{23}$ bit pad. After, of course, passing the 1SD test and test for uniqueness by comparing the first 42 bits to all previous pads made for that circle, as all new pads must.

Pads made are stored on the device for use, or stored to an external device if preferred, and can easily be checked by a variety of randomness tests. They do not need to be indistinguishable from true random sequences since their role in encryption is only one of many complex steps in the SPAE cipher.

UK Setup

When a UK is entered it is first expanded into sixteen sequences of $2^{23}$ bits each following the same process as PadGen. From these sequences all of the many tables used during the cipher are made. Sixty four tables for c-text character conversion that each have a unique arrangement of all 64 unique six bit sequences needed, skipping seq's already found until each program able is found. A different table is used for the 64 programs that are chosen at random, determined by pad bits, with every new file that is encrypted, for c-text character representation. The 512 factorial Permutation process used for the final step in PadGen is also found in the same way from the sixteen $2^{23}$ sequences used for PadGen. But this requires finding all 512 unique nine-bit sequences, checking nine bits at a time and skipping if a sequence has already been found. When all the numbers needed and tables are found, they are stored on the device for use in PadGen and Encryption.

A variant disguising the true file type in the c-text file name could also be advantageous. Users could choose what table for file names listed that equate to the true file type in a communication circle as assigned by the circle manager. So a file that has .jpg as an extension could actually be a .txt file or another type. Since there are many file types it would force codebreakers to guess what the correct type is to convert to original file from p-text sequence.

Why SPAE is Stronger

The UK size is far larger than ciphers commonly used today, thought to be secure. But the cipher strength comes from more than that. Once understood, attacking it will be seen as a fool's errand.

The SPAE cipher employs Compartmentalized, Dynamic, Complexity resulting in unprecedented strength. Files encrypted have the highest level of computational security. It is encryption designed to secure files for centuries, rather than hoping for it to only ensure file security for decades.

I claim:

1. A method for efficient encryption of text files, comprising the steps of:

loading a plain text bit file for encryption into a computing device, determining if total bit number of said plain text file is divisible by six and adding any necessary bits to result in bit number of said plaint text file is perfectly divisible by six, creating and then combining a bit sequence with a matching number of pad bits using XOR (exclusive or) cipher resulting in a modified file, converting said modified file to cipher text, six bits a time, using a conversion table, rearranging the entire cipher text sequence using Prime Set Permutation ("PSP") to create a text sequence, inserting a PSP lock character into said text sequence, inserting pad pointer sequence ("PPS") characters into said text sequence and assigning, saving and displaying a file name, wherein an encrypted file is created.

2. The method of claim 1 and further comprising decrypting the encrypted file created by the method of claim 1, said decrypting comprising the steps of removing said pad pointer sequence characters, removing said Prime Set Permutation lock character from said cyber-text sequence, reversing said Prime Set Permutation using correct 52 bits, determining each cyber-text character bit representations using a conversion table, and using a correct pad bit sequence and logically combing said correct pad bit sequence with XOR (exclusive or) to result in a decrypted file, removing any extra bits, and displaying said decrypted file or storing said decrypted file or both displaying and storing said decrypted file.

3. The method of claim 1 further comprising transmitting said encrypted file by email.

4. The method of claim 1 wherein plain text bit file is combined with pad, and 42 pad pointer sequence bits, mixed into said cipher-text bit sequence.

5. The method of claim 1, wherein said 42 PPS bits are inserted as a group.

6. The method of claim 1 wherein more bits than those needed to ensure perfect divisibility by six are added.

7. The method of claim 1 where a plurality of conversion tables for c-text characters and modifier with separate modifiers for each table are used to increase variability in c-text sequences.

* * * * *